US012804559B2

(12) United States Patent

Liu et al.

(10) Patent No.: US 12,804,559 B2
(45) Date of Patent: Nov. 17, 2026

(54) POWER HEADROOM REPORT IN UNIFIED TCI FRAMEWORK

(71) Applicant: Lenovo (Beijing) Limited, Beijing (CN)

(72) Inventors: Bingchao Liu, Beijing (CN); Chenxi Zhu, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 256 days.

(21) Appl. No.: 18/718,724

(22) PCT Filed: Dec. 17, 2021

(86) PCT No.: PCT/CN2021/139022
§ 371 (c)(1),
(2) Date: Jun. 11, 2024

(87) PCT Pub. No.: WO2023/108593
PCT Pub. Date: Jun. 22, 2023

(65) Prior Publication Data

US 2025/0048277 A1 Feb. 6, 2025

(51) Int. Cl.

| | |
|---|---|
| ***H04W 52/36*** | (2009.01) |
| ***H04B 7/06*** | (2006.01) |
| ***H04W 52/08*** | (2009.01) |
| ***H04W 52/24*** | (2009.01) |
| ***H04W 52/28*** | (2009.01) |
| ***H04W 52/42*** | (2009.01) |

(52) U.S. Cl.
CPC ......... *H04W 52/365* (2013.01); *H04W 52/08* (2013.01)

(58) Field of Classification Search
CPC ............... H04W 52/365; H04W 52/08; H04W 52/242; H04W 52/288; H04W 52/42; H04B 7/0639; H04B 7/0665
See application file for complete search history.

(56) References Cited

U.S. PATENT DOCUMENTS

| | | | | |
|---|---|---|---|---|
| 2019/0261281 | A1 | 8/2019 | Jung et al. | |
| 2020/0100179 | A1 | 3/2020 | Zhou et al. | |
| 2023/0032909 | A1 * | 2/2023 | Matsumura | H04W 72/04 |
| 2025/0119847 | A1 * | 4/2025 | Cirik | H04W 52/34 |

FOREIGN PATENT DOCUMENTS

| | | | |
|---|---|---|---|
| EP | 4360354 | A1 | 5/2024 |
| EP | 4381819 | A1 | 6/2024 |
| EP | 4393190 | A1 | 7/2024 |
| WO | 2021068881 | | 4/2021 |

(Continued)

OTHER PUBLICATIONS

3rd Generation Partnership Proje , "Discussion on testability of pathloss-RS activation delay", 3GPP TSG-RAN WG4 Meeting #99-e, R4-2110282, May 19, 2021, 3 pages.

(Continued)

*Primary Examiner* — Harry H Kim
(74) *Attorney, Agent, or Firm* — FIG. 1 Patents

(57) ABSTRACT

Methods and apparatuses for power headroom report in unified TCI framework are disclosed. In one embodiment, a method comprises determining power control parameters used for calculating power headroom according to a configured or activated or indicated UL TCI state or jointed DL/UL TCI state; calculating the power headroom based on the determined power control parameters; and transmitting the calculated power headroom.

11 Claims, 2 Drawing Sheets

(56) References Cited

FOREIGN PATENT DOCUMENTS

| | | |
|---|---|---|
| WO | 2021208086 A1 | 10/2021 |
| WO | 5254528086 | 10/2021 |

OTHER PUBLICATIONS

3rd Generation Partnership Proje , "Enhancements on multi-beam operation", 3GPP TSG RAN WG1 #105-e, R1-2104484, May 19, 2021, 12 pages.

3rd Generation Partnership Proje , "Enhancements on Multi-beam Operation", 3GPP TSG RAN WG1 Meeting #106bis-e, R1-2108870, Oct. 11, 2021, 26 pages.

PCT/CN2021/139022 , "International Search Report and Written Opinion", International Application No. PCT/CN2021/139022, Aug. 25, 2022, 7 pages.

"Extended European Search Report", EP Application No. 219677275, Apr. 2, 2025, 11 pages.

"Physical layer procedures for control (Release 16)", 3GPP; Technical Specification Group Radio Access Network; NR; 3GPP TS 38.213 V16.7.0 (Sep. 2021). [Retrieved from the Internet] <https://ftp.3gpp.org/Specs/archive/38_series/38.213/38213-g70.zip 38213-g70.docx>, Sep. 2021, 188 pages.

Moderator (Samsung), "Moderator summary#4 for multi-beam enhancement: Round 3", 3GPP TSG RAN WG1 #106-e, R1-2108399, e-Meeting, Aug. 16-27, 2021. [Retrieved from the Internet] <https://ftp.3gpp.org/tsg_ran/WG1_RL1/TSGR1_106-e/Docs/R1-2108399.zip R1-2108399FeMIMO Item 1 Round 3—final (based onV79).docx>, Aug. 2021, 42 pages.

NTT DOCOMO, INC., et al., "Discussion on multi-beam operation", 3GPP TSG RAN WG1 #104bis-e, R1-2103559, e-Meeting, Apr. 12-Apr. 20, 2021.[Retrieved from the Internet] <https://ftp.3gpp.org/tsg_ran/WG1_RL1/TSGR1_104b-e/Docs/R1-2103559.zipR1-2103559.docx>, Apr. 2021, 20 pages.

Examination Report issued in GB2409243.9, mailed Feb. 13, 2026, 6 pages.

* cited by examiner

POWER HEADROOM REPORT IN UNIFIED TCI FRAMEWORK

RELATED APPLICATION

This application claims priority to International Application Number PCT/CN2021/139022 filed 17-12-2021 entitled "Power Headroom Report in Unified TCI Framework," the disclosure of which is incorporated by reference herein in its entirety.

FIELD

The subject matter disclosed herein generally relates to wireless communications, and more particularly relates to methods and apparatuses for power headroom report in unified TCI framework.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), Receiver (RX), Maximum Power Reduction (MPR), Power management Maximum Power Reduction (P-MPR), Power Headroom Report (PHR), Medium Access Control (MAC), MAC control element (MAC CE), power headroom (PH), uplink shared channel (UL-SCH), Physical Uplink Shared Channel (PUSCH), Physical Uplink Control Channel (PUCCH), Sounding Reference Signal (SRS), transmission reception point (TRP), band width part (BWP), TS (Technical Specification) (TS refers to 3GPP Technical Specification in this disclosure), Pathloss reference signal (PL-RS), Downlink Control Information (DCI), Transmission Configuration Indicator (TCI), quasi-colocation (QCL), component carrier (CC), Physical Downlink Shared Channel (PDSCH), Physical Downlink Control Channel (PDCCH).

Power headroom (PH) is reported by UE to the gNB to indicate the power availability for UL transmission.

A Power Headroom Report (PHR) shall be triggered if a configured timer, e.g., phr-ProhibitTimer, expires or has expired and the pathloss has changed more than a configured threshold, e.g., phr-Tx-PowerFactorChange dB for at least one activated Serving Cell of any MAC entity of which the active DL BWP is not dormant BWP which is used as a pathloss reference since the last transmission of a PHR in this MAC entity when the MAC entity has UL resources for new transmission. Note that the pathloss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.

Power Headroom (PH) can be Type 1 PH or Type 3 PH.

Type 1 power headroom: it refers to the difference between the nominal UE maximum transmit power and the estimated power for UL-SCH (uplink shared channel) transmission per activated serving cell. Type 1 power headroom for an activated serving cell may be calculated based on a reference PUSCH transmission. For example, for PUSCH transmission occasion i on active UL BWP b of carrier f of serving cell c, if the PUSCH is transmitted using PUSCH power control parameter set configuration with index j and PUSCH power control adjustment state with index l, the UE computes the Type 1 power headroom as $PH_{type1,b,f,c}(i, j, q_d, l)=\tilde{P}_{CMAX,f,c}(i)-\{P_{O\_PUSCH,b,f,c}(j)+\alpha_{b,f,c}(j). PL_{b,f,c}(q_d)++f_{b,f,c}(i, l)\}$ [dB].

wherein, $\tilde{P}_{CMAX,f,c}(i)$ is computed assuming MPR (which is allowed maximum power reduction)=0) dB, A-MPR (which is additional maximum power reduction)=0) dB. P-MPR=0) dB, and $\Delta T_C$ (which is allowed operating band edge transmission power relaxation)=0) dB, where MPR, A-MPR, P-MPR and $\Delta T_C$ are defined in TS 38.101-1, TS 38.101-2 and TS 38.101-3: the remaining parameters are defined in Clause 7.1.1 of TS 38.213 V16.3.0, where $P_{O\_PUSCH,b,f,c}(j)$ and $\alpha_{b,f,c}(j)$ are obtained using $P_{O\_NORMAL\_PUSCH,b,f,c}(0)$ and p0-PUSCH-AlphaSetId=0: $PL_{b,f,c}(q_d)$ is obtained using pusch-PathlossReferenceRS-Id=0; and l=0).

Type 3 power headroom: it refers to the difference between the nominal UE maximum transmit power and the estimated power for SRS (Sounding Reference Signal) transmission per activated Serving Cell. Type 3 power headroom for an activated serving cell may be calculated based on a reference SRS transmission. For example, for SRS transmission occasion i on active UL BWP b of carrier f of serving cell c, and if the UE is not configured for PUSCH transmissions on UL BWP b of carrier f of serving cell c and a resource for the reference SRS transmission is provided by SRS-Resource, the UE computes a Type 3 power headroom report as $PH_{type3,b,f,c}(i, q_s)=\tilde{P}_{CMAX,f,c}(i)-\{P_{O\_SRS,b,f,c}(q_s)+\alpha_{SRS,b,f,c}(q_s). PL_{b,f,c}(q_d)+h_{b,f,c}(i)\}$ [dB].

wherein, $q_s$ is an SRS resource set corresponding to SRS-ResourceSetId=0 for UL BWP b: $P_{O\_SRS,b,f,c}(q_s)$, $\alpha_{SRS,b,f,c}(q_s)$, $PL_{b,f,c}(q_d)$ and $h_{b,f,c}(i)$ are defined in Clause 7.3.1 of TS 38.213 V16.3.0 with corresponding values obtained from SRS-ResourceSetId=0 for UL BWP b: $P_{CMAX,f,c}(i)$ is computed assuming MPR=0 dB, A-MPR=0 dB, P-MPR=0) dB and $\Delta T_C$=0 dB, where MPR, A-MPR, P-MPR and $\Delta T_C$ are defined in TS 38.101-1 V16.3.0, TS 38.101-2 V16.3.0 and TS 38.101-3 V16.3.0.

Under NR Release 15 TCI framework, when the type 1 power headroom is based on an actual PUSCH transmission, the power control parameters are determined by SRS resource indicator (SRI) field value indicated in the DCI scheduling the PUSCH transmission when SRI field is contained in the scheduling DCI. Additionally, a set of default power control parameters were determined for the type 1 PH calculation if the type 1 PH is determined based on a reference PUSCH transmission.

Unified TCI framework for both DL and UL is introduced in NR Release 17. According to unified TCI framework for UL, all PUCCH and PUSCH transmissions in a cell may share a same indicated UL TCI state at least for single TRP scenario. DCI based UL TCI state update for all PUCCH and PUSCH transmissions of a cell are also agreed to be supported for unified TCI framework. In the unified TCI framework, the power control parameters for PUSCH are determined by the PL-RS and PUSCH power control parameter setting associated with the UL TCI state or joint DL/UL TCI state indicated by the DCI. It is yet unknown on how to determine the power control parameters for PH calculation under the unified TCI framework.

This disclosure targets determining the power control parameters for the power headroom report for type 1 PH as well as type 3 PH under the unified TCI framework.

BRIEF SUMMARY

Methods and apparatuses for power headroom report in unified TCI framework are disclosed.

In one embodiment, a method of a UE comprises determining power control parameters used for calculating power headroom according to a configured or activated or indicated UL TCI state or jointed DL/UL TCI state; calculating the power headroom based on the determined power control parameters; and transmitting the calculated power headroom.

In one embodiment, when the power headroom is calculated based on an actual PUSCH transmission, and a PL-RS and a set of P0, alpha and closed loop index for PUSCH are associated with the indicated UL TCI state or joint DL/UL TCI state, $P_{O\_USE\_PUSCH,b,f,c}(j)$ and $\alpha_{b,f,c}(j)$ in the power control parameters are obtained, respectively, by P0 and alpha configured in the set of P0, alpha and closed loop index for PUSCH associated with the indicated UL TCI state or joint DL/UL TCI state, and $PL_{b,f,c}(q_d)$ in the power control parameters is calculated using the RS resource index $q_d$ determined from the PL-RS associated with the indicated UL TCI state or joint DL/UL TCI state.

In another embodiment, when the power headroom is calculated based on a reference PUSCH transmission, and a set of P0, alpha and closed loop index for PUSCH and/or a common set of P0, alpha and closed loop index are associated with the configured or indicated UL TCI state or joint DL/UL TCI state, $P_{O\_PUSCH,b,f,c}(j)$ and $\alpha_{b,f,c}(j)$ in the power control parameters are obtained, respectively, by P0 and alpha configured in the set of P0, alpha and closed loop index for PUSCH associated with the indicated UL TCI state or the joint DL/UL TCI state, or P0 and alpha configured in the set of P0, alpha and closed loop index for PUSCH having the lowest index, or P0 and alpha configured in the common set of P0, alpha and closed loop index having the lowest index. When the power headroom is calculated based on a reference PUSCH transmission, $PL_{b,f,c}(q_d)$ in the power control parameters is obtained using the reference signal (RS) index $q_d$ determined from the PL-RS associated with the indicated UL TCI state or joint DL/UL TCI state, or the PL-RS associated with the activated UL TCI state or joint DL/UL TCI state having the lowest TCI state ID, or the PL-RS associated with the configured UL TCI state or joint DL/UL TCI state having the lowest TCI state ID.

In yet another embodiment, when the power headroom is calculated based on an actual SRS transmission, and a PL-RS and a set of P0, alpha and closed loop index for SRS are associated with the indicated UL TCI state or joint DL/UL TCI state, $P_{O\_SRS,b,f,c}(q_s)$ and $\alpha_{SRS,b,f,c}(q_s)$ in the power control parameters are obtained, respectively, by P0 and alpha configured in the set of P0, alpha and closed loop index for SRS associated with the indicated UL TCI state or joint DL/UL TCI state, and $PL_{b,f,c}(q_d)$ in the power control parameters is calculated using the RS resource index $q_d$ determined from the PL-RS associated with the indicated UL TCI state or joint DL/UL TCI state.

In a further embodiment, when the power headroom is calculated based on a reference SRS transmission, and a set of P0, alpha and closed loop index for SRS and/or a common set of P0, alpha and closed loop index are associated with the configured or indicated UL TCI state or joint DL/UL TCI state, $P_{O\_SRS,b,f,c}(q_s)$ and $\alpha_{SRS,b,f,c}(q_s)$ in the power control parameters are obtained, respectively, by P0 and alpha configured in the set of P0, alpha and closed loop index for SRS associated with the indicated UL TCI state or joint DL/UL TCI state, or P0 and alpha configured in the set of P0, alpha and closed loop index for SRS having the lowest index, or P0 and alpha configured in the common set of P0, alpha and closed loop index having the lowest index. When the power headroom is calculated based on a reference SRS transmission, $PL_{b,f,c}(q_d)$ in the power control parameters is obtained using the reference signal (RS) index $q_d$ determined from the PL-RS associated with the indicated UL TCI state or the joint DL/UL TCI state, or the PL-RS associated with the activated UL TCI state or joint DL/UL TCI state having the lowest TCI state ID, or the PL-RS associated with the configured UL TCI state or joint DL/UL TCI state having the lowest TCI state ID.

In another embodiment, a UE comprises a processor that determines power control parameters used for calculating power headroom according to a configured or activated or indicated UL TCI state or jointed DL/UL TCI state, and calculates the power headroom based on the determined power control parameters; and a transmitter that transmits the calculated power headroom.

In still another embodiment, a method of a base unit comprises determining power control parameters used for calculating power headroom according to a configured or activated or indicated UL TCI state or jointed DL/UL TCI state; and receiving the power headroom calculated based on the determined power control parameters In yet another embodiment, a base unit comprises a processor that determines power control parameters used for calculating power headroom according to a configured or activated or indicated UL TCI state or jointed DL/UL TCI state; and a receiver that receives the power headroom calculated based on the determined power control parameters.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
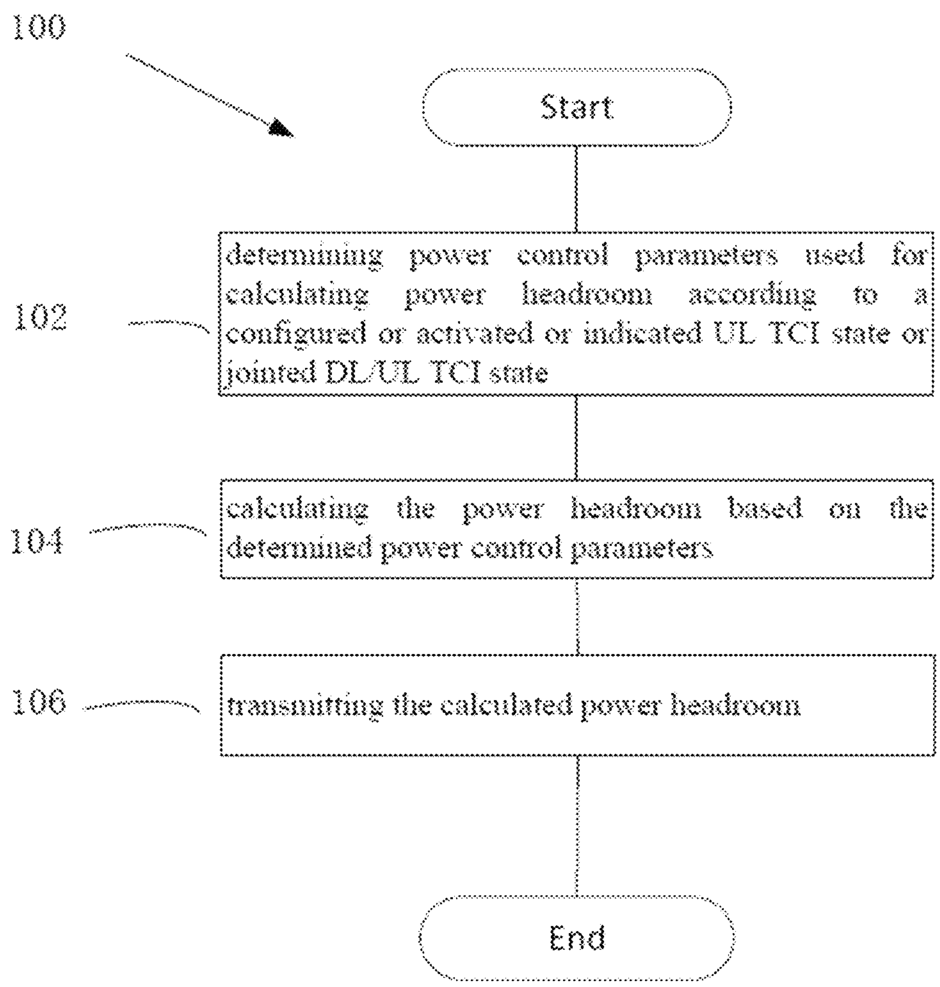
FIG. 1 is a schematic flow chart diagram illustrating an embodiment of a method.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

In NR Release 17 unified TCI framework, joint DL/UL TCI or separate DL/UL TCI can be configured for a cell by RRC signaling.

When separate DL/UL TCI is configured, the DL TCI state for DL reception and UL TCI state for UL transmission are separately indicated. For UL TCI state, the source reference signal in the UL TCI provides a reference for determining UL TX spatial filter at least for dynamic-grant or configured-grant based PUSCH and all of dedicated PUCCH resources, which are the PUCCH resources in RRC-connected mode, in a CC. For DL TCI state, the source reference signal(s) (one source reference signal is contained if only the higher layer parameter qcl-Type1 is configured, and two source reference signals are contained if both the higher layer parameter qcl-Type1 and the higher layer parameter qcl_Type2 are configured) in the DL TCI provides QCL information at least for UE-dedicated reception on PDSCH and all of CORESETs in a CC. Each CORESET is configured by a set time-frequency resource for PDCCH reception. In this situation, a PL-RS is associated with the indicated UL TCI state for path loss calculation. UL power control parameters other than PL-RS (e.g. set of P0, alpha and closed loop index) for PUSCH, PUCCH and SRS may also be associated with the indicated UL TCI state.

When joint DL/UL TCI is configured, both UL TCI state for UL transmission and DL TCI state for DL reception are determined by a single indicated joint DL/UL TCI state. When the joint DL/UL TCI state is configured, a joint TCI refers to at least a common source reference RS used for determining both the DL QCL information and the UL TX spatial filter. For example, the UL TX beam and the DL RX beam are both determined by the QCL-TypeD RS configured in the indicated joint DL/UL TCI state. In this situation, a PL-RS is associated with the indicated joint DL/UL TCI state for path loss calculation. UL power control parameters other than PL-RS (e.g. set of P0, alpha and closed loop index) for PUSCH, PUCCH and SRS may also be associated with the indicated joint DL/UL TCI state.

A brief introduction of the TCI state is provided as follows:

The UE can be configured with a list of up to M TCI-State configurations to decode PDSCH according to a detected PDCCH with DCI intended for the UE and the given serving cell, where M depends on the UE capability. The TCI-state is configured by the following RRC signaling:

The IE TCI-State associates one or two DL reference signals with a corresponding quasi-colocation (QCL) type.

TCI-State information element

```
TCI-State ::=           SEQUENCE {
  tci-StateId             TCI-StateId,
  qcl-Type1                 QCL-Info,
  qcl-Type2               QCL-Info
  ...
}
QCL-Info ::=            SEQUENCE {
  cell                  ServCellIndex
  bwp-Id                  BWP-Id
  referenceSignal             CHOICE {
    csi-rs                NZP-CSI-RS-ResourceId,
    ssb                   SSB-Index
  },
  qcl-Type                  ENUMERATED {typeA, typeB, typeC, typeD},
  ...
}
```

Each TCI-State contains parameters for configuring a quasi co-location (QCL) relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

The UE receives an activation command used to map up to 8 TCI states to the codepoints of the DCI field 'Transmission Configuration Indication' in one DL BWP of a serving cell. When a UE supports two TCI states in a codepoint of the DCI field 'Transmission Configuration Indication' the UE may receive an activation command, the activation command is used to map up to 8 combinations of one or two TCI states to the codepoints of the DCI field 'Transmission Configuration Indication'.

In the present disclosure, the following parameters are defined:

A set of P0, alpha and closed loop index for PUSCH, e.g., p0_Alpha_CLIdPUSCHSet: Each p0_Alpha_CLIdPUSCHSet includes a set of UL power control parameters other than PL-RS (e.g. set of P0, alpha and closed loop index) for PUSCH. Each p0_Alpha_CLIdPUSCHSet has an index, e.g., p0_Alpha_CLIdPUSCHSetId.

A set of P0, alpha and closed loop index for SRS, e.g., p0_Alpha_CLIdSRSSet: Each p0_Alpha_CLIdSRSSet includes a set of UL power control parameters other than PL-RS (e.g. set of P0, alpha and closed loop index) for SRS. Each p0_Alpha_CLIdSRSSet has an index, e.g., p0_Alpha_CLIdSRSSetId.

Multiple p0_Alpha_CLIdPUSCHSets, and multiple p0_Alpha_CLIdSRSSets shall be configured for a UE in a BWP. Each UL TCI state or joint DL/UL TCI state is associated with a p0_Alpha_CLIdPUSCHSet, and a p0_Alpha_CLIdSRSSet.

In addition, multiple common sets of P0, alpha and closed loop index (e.g. multiple p0_Alpha_CLIdSets) can be defined. Each p0_Alpha_CLIdSet includes a set of UL power control parameters other than PL-RS (e.g. set of P0, alpha and closed loop index). Each p0_Alpha_CLIdSet has an index, e.g., p0_Alpha_CLIdSetId.

Instead of separately configuring P0, alpha and closed loop index to each of multiple sets of P0, alpha and closed loop index for PUSCH (e.g. multiple p0_Alpha_CLIdPUSCHSets), and each of multiple sets of P0, alpha and closed loop index for SRS (e.g. multiple p0_Alpha_CLIdSRSSets), when multiple common sets of P0, alpha and closed loop index (e.g. multiple p0_Alpha_CLIdSets) are configured for a UE in a BWP, each of multiple sets of P0, alpha and closed loop index for PUSCH (e.g. multiple p0_Alpha_CLIdPUSCHSets) and each of multiple sets of P0, alpha and closed loop index for PUSCH (e.g. multiple p0_Alpha_CLIdSRSSets) can alternatively indicate an index of the common set of P0, alpha and closed loop index (e.g. p0_Alpha_CLIdSetId) indicating a common set of P0, alpha and closed loop index (e.g. p0_Alpha_CLIdSet).

A first embodiment relates to Type 1 PH report for PUSCH under unified TCI framework.

Type 1 PH shall be calculated for the PHR triggered by new UL transmission in the cell configured with PUSCH transmission. In this situation, the gNB wants to know the available power for the scheduled UL transmission. The type 1 PH shall be calculated based on actual PUSCH transmission.

If the type 1 power headroom report for an activated serving cell is based on an actual PUSCH transmission, for PUSCH transmission occasion i on active UL BWP b of carrier f of serving cell c, the UE computes the Type 1 power headroom report as:

$$PH_{type1,b,f,c}(i, j, q_d, l) = P_{CMAX,f,c}(i) - \{P_{O\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l)\}$$

where, $P_{CMAX,f,c}(i)$ is the UE configured maximum output power for carrier f of serving cell c in PUSCH transmission occasion i.

$P_{O\_PUSCH,b,f,c}(j)$ is the target received power at the gNB and is a parameter composed of the sum of a component $P_{O\_NORMAL\_PUSCH,b,f,c}(j)$ and a component $P_{O\_UE\_PUSCH,b,f,c}(j)$. $P_{O\_NORMAL\_PUSCH,b,f,c}(j)$ is configured by RRC signaling. For PUSCH transmission scheduled by DCI and configured grant PUSCH transmission, when UL power control parameters other than PL-RS (e.g. set of P0, alpha and closed loop index) for PUSCH is associated with the indicated UL TCI state or joint DL/UL TCI state, the UE determines the value of $P_{O\_UE\_PUSCH,b,f,c}(j)$ from the P0 configured in the p0_Alpha_CLIdPUSCHSet associated with the indicated UL TCI state or joint DL/UL TCI state.

$\alpha_{b,f,c}(j)$ is the path loss compensation factor. For PUSCH transmission scheduled by DCI and configured grant PUSCH transmission, when UL power control parameters other than PL-RS (e.g. set of P0, alpha and closed loop index) for PUSCH is associated with the indicated UL TCI state or joint DL/UL TCI state, the UE determines the value of $\alpha_{b,f,c}(j)$ from alpha configured in the p0_Alpha_CLIdPUSCHSet associated with the indicated UL TCI state or joint DL/UL TCI state.

$$M_{RB,b,f,c}^{PUSCH}(i)$$

is the bandwidth of the PUSCH resource assignment expressed in number of resource blocks for PUSCH transmission occasion i on active UL BWP b of carrier f of serving cell c and μ is the SCS configured for the BWP.

$PL_{b,f,c}(q_d)$ is a downlink pathloss estimate in dB calculated by the UE using reference signal (RS) index $q_d$ for the activated DL BWP b of carrier f of serving cell c. For PUSCH transmission scheduled by DCI and configured grant PUSCH transmission, the UE determines the RS resource index $q_d$ from the value of PL-RS associated with the indicated UL TCI state or joint DL/UL TCI state.

$\Delta_{TF,b,f,c}(i)$ is a power adjustment according to the MCS used for the PUSCH transmission.

$f_{b,f,c}(i, l)$ is the PUSCH power control adjustment state/for active UL BWP b of carrier f of serving cell c and PUSCH transmission occasion i.

Timer based PH reporting is also supported by configuring a timer (e.g. a higher layer parameter phr-PeriodicTimer). When phr-PeriodicTimer expires, a PHR shall be triggered. If there is no available PUSCH transmission when the type 1 PH is calculated, the type 1 PH shall be calculated based on a reference PUSCH transmission.

According to a variety of the first embodiment, if the UE determines that a Type 1 power headroom report for an activated serving cell is based on a reference PUSCH transmission, for PUSCH transmission occasion i on active UL BWP b of carrier f of serving cell c, the UE computes the Type 1 power headroom report as:

$$PH_{type1,b,f,c}(i, j, q_d, l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i, l)\}$$

where, $\tilde{P}_{CMAX,f,c}(i)$ is computed assuming MPR=0 dB, A-MPR=0 dB, P-MPR=0 dB, $\Delta T_C$=0 dB. Because there is no actual PUSCH transmission, how to determine the power control parameters (e.g. values of $P_{O\_PUSCH,b,f,c}(j)$, $\alpha_{b,f,c}(j)$ and $PL_{b,f,c}(q_d)$) should be specified. Different options can be considered.

Option 1 for $P_{O\_PUSCH,b,f,c}(j)$ and $\alpha_{b,f,c}(j)$ for PUSCH:

$P_{O\_PUSCH,b,f,c}(j)$ and $\alpha_{b,f,c}(j)$ are obtained, respectively, by P0 and alpha configured in the p0_Alpha_CLIdPUSCHSet associated with the indicated UL TCI state or the joint DL/UL TCI state.

Option 2 for $P_{O\_PUSCH,b,f,c}(j)$ and $\alpha_{b,f,c}(j)$ for PUSCH:

$P_{O\_PUSCH,b,f,c}(j)$ and $\alpha_{b,f,c}(j)$ are obtained, respectively, by P0 and alpha configured in the p0_Alpha_CLIdPUSCHSet having the lowest index (e.g. p0_Alpha_CLIdPUSCHSetId=0).

Option 3 for $P_{O\_PUSCH,b,f,c}(j)$ and $\alpha_{b,f,c}(j)$ for PUSCH:

$P_{O\_PUSCH,b,f,c}(j)$ and $\alpha_{b,f,c}(j)$ are obtained, respectively, by P0 and alpha configured in the p0_Alpha_CLIdSet having the lowest index (e.g. p0_Alpha_CLIdSetId=0).

Option 1 for $PL_{b,f,c}(q_d)$ for PUSCH:

$PL_{b,f,c}(q_d)$ is obtained using the reference signal (RS) index $q_d$ determined from the PL-RS associated with the indicated UL TCI state or the joint DL/UL TCI state.

Option 2 for $PL_{b,f,c}(q_d)$ for PUSCH:

$PL_{b,f,c}(q_d)$ is obtained using the reference signal (RS) index $q_d$ determined from the PL-RS associated with the activated UL TCI state or joint DL/UL TCI state having the lowest TCI state ID.

Option 3 for $PL_{b,f,c}(q_d)$ for PUSCH:

$PL_{b,f,c}(q_d)$ is obtained using the reference signal (RS) index $q_d$ determined from the PL-RS associated with the configured UL TCI state or joint DL/UL TCI state having the lowest TCI state ID (i.e. TCI-stateId=0).

A second embodiment relates to Type 3 PH report for PUSCH under unified TCI framework.

Type 3 PH shall be calculated for the PHR triggered by new UL transmission for the cell without configured PUSCH transmission. In this situation, the gNB wants to know the available power for the scheduled SRS transmission. The type 3 PH shall be calculated based on actual SRS transmission.

If the type 3 power headroom report for an activated serving cell is based on an actual SRS transmission, for SRS transmission occasion i on active UL BWP b of carrier f of serving cell c, the UE computes the Type 3 power headroom report as:

$$PH_{type3,b,f,c}(i, q_s) = P_{CMAX,f,c}(i) - \{P_{O\_SRS,b,f,c}(q_s) + 10\log_{10}(2^{\mu} \cdot M_{SRS,b,f,c}(i)) + \alpha_{SRS,b,f,c}(q_s) \cdot PL_{b,f,c}(q_d) + h_{b,f,c}(i)\}$$

where, $P_{CMAX,f,c}(i)$ is the UE configured maximum output power for carrier f of serving cell c in SRS transmission occasion.

$P_{O\_SRS,b,f,c}(q_s)$ is the target received power at the gNB and is provided by the P0 in the p0_Alpha_CLIdSRSSet associated with the indicated UL TCI state or joint DL/UL TCI state when the UE determines to apply the indicated UL TCI state or the joint DL/UL TCI state to the SRS resources.

$\alpha_{SRS,b,f,c}(q_s)$ is the path loss compensation factor and is provided by the alpha in the p0_Alpha_CLIdSRSSet associated with the indicated UL TCI state or joint DL/UL TCI state when the UE determines to apply the indicated UL TCI state or the joint DL/UL TCI state to the SRS resources.

$M_{SRS,b,f,c}(i)$ is the SRS bandwidth expressed in number of resource blocks for SRS transmission occasion i on active UL BWP b of carrier f of serving cell c and μ is the SCS configured for the BWP.

$PL_{b,f,c}(q_d)$ is a downlink pathloss estimate in dB calculated by the UE using reference signal (RS) index $q_d$ for the activated DL BWP b of carrier f of serving cell c. The UE determines the RS resource index $q_d$ from the value of PL-RS associated with the indicated UL TCI state or joint DL/UL TCI state.

$h_{b,f,c}(i)$ is the SRS power control adjustment state/for active UL BWP b of carrier f of serving cell c and SRS transmission occasion i.

Timer based type 3 PH reporting is also supported by configuring a timer (e.g. a higher layer parameter phr-PeriodicTimer). When phr-PeriodicTimer expires, a PHR shall be triggered. If there is no available SRS transmission when the type 3 PH is calculated, the type 3 PH shall be calculated based on a reference SRS transmission.

According to a variety of the second embodiment, if the UE determines that a Type 3 power headroom report for an activated serving cell is based on a reference SRS transmission, for SRS transmission occasion i on active UL BWP b of carrier f of serving cell c, the UE computes the Type 3 power headroom report as:

$$PH_{type1,b,f,c}(i, q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h(i)\}$$

where, $\tilde{P}_{CMAX,f,c}(i)$ is computed assuming MPR=0 dB, A-MPR=0 dB, P-MPR-0 dB, $\Delta T_C$=0 dB. Because there is no actual SRS transmission, how to determine the power control parameters (e.g. values of $P_{O\_SRS,b,f,c}(q_s)$, $\alpha_{SRS,b,f,c}(q_s)$ and $PL_{b,f,c}(q_d)$) should be specified. Different options can be considered.

Option 1 for $P_{O\_SRS,b,f,c}(q_s)$ and $\alpha_{SRS,b,f,c}(q_s)$ for SRS:

$P_{O\_SRS,b,f,c}(q_s)$ and $\alpha_{SRS,b,f,c}(q_s)$ are obtained, respectively, by P0 and alpha configured in the p0_Alpha_CLIdSRSSet associated with the indicated UL TCI state or joint DL/UL TCI state.

Option 2 for $P_{O\_SRS,b,f,c}(q_s)$ and $\alpha_{SRS,b,f,c}(q_s)$ for SRS:

$P_{O\_SRS,b,f,c}(q_s)$ and $\alpha_{SRS,b,f,c}(q_s)$ are obtained, respectively, by P0 and alpha configured in the p0_Alpha_CLIdSRSSet having the lowest index (e.g. p0_Alpha_CLIdSRSSetId=0).

Option 3 for $P_{O\_SRS,b,f,c}(q_s)$ and $\alpha_{SRS,b,f,c}(q_s)$ for SRS:

$P_{O\_SRS,b,f,c}(q_s)$ and $\alpha_{SRS,b,f,c}(q_s)$ are obtained, respectively, by P0 and alpha configured in the p0_Alpha_CLIdSet having the lowest index (e.g. p0_Alpha_CLIdSetId=0).

Option 1 for $PL_{b,f,c}(q_d)$ for SRS:

$PL_{b,f,c}(q_d)$ is obtained using the reference signal (RS) index $q_d$ determined from the PL-RS associated with the indicated UL TCI state or joint DL/UL TCI state.

Option 2 for $PL_{b,f,c}(Aa)$ for SRS:

$PL_{b,f,c}(q_d)$ is obtained using the reference signal (RS) index $q_d$ determined from the PL-RS associated with the activated UL TCI state or joint DL/UL TCI state having the lowest TCI state ID.

Option 3 for $PL_{b,f,c}(q_d)$ for SRS:

$PL_{b,f,c}(q_d)$ is obtained using the reference signal (RS) index $q_d$ determined from the PL-RS associated with the configured UL TCI state or joint DL/UL TCI state having the lowest TCI state ID (i.e. TCI-StateId=0).

Examples of the first embodiment and the second embodiment are described as follows:

A total of 64 UL TCI states, e.g., UL TCI-state-0, . . . , UL TCI-state-63, are configured for a BWP of a UE by RRC signaling. 4 UL TCI states among the total of 64 UL TCI states, e.g., UL TCI-state-5, UL TCI-state-14, UL TCI-state-23 and UL TCI-state-45, are activated by a MAC CE. Each activated UL TCI state is mapped to a TCI codepoint.

16 p0_Alpha_CLIdSets, i.e., p0_Alpha_CLIdSet-0 . . . p0_Alpha_CLIdSet-15 (e.g. indicated by p0_Alpha_CLIdSetId-0, . . . , p0_Alpha_CLIdSetId-15) are configured for a BWP of a UE.

p0_Alpha_CLIdPUSCHSet-0=p0_Alpha_CLIdSetId-0 (indicating p0_Alpha_CLIdSet-0).

p0_Alpha_CLIdPUSCHSet-1=p0_Alpha_CLIdSetId-1 (indicating p0_Alpha_CLIdSet-1).

p0_Alpha_CLIdPUSCHSet-2=p0_Alpha_CLIdSetId-2 (indicating p0_Alpha_CLIdSet-2).

p0_Alpha_CLIdPUSCHSet-3=p0_Alpha_CLIdSetId-3 (indicating p0_Alpha_CLIdSet-3) are configured for a BWP of the UE.

p0_Alpha_CLIdSRSSet-0=p0_Alpha_CLIdSetId-4 (indicating p0_Alpha_CLIdSet-4).

p0_Alpha_CLIdSRSSet-1=p0_Alpha_CLIdSetId-5 (indicating p0_Alpha_CLIdSet-5).

p0_Alpha_CLIdSRSSet-2=p0_Alpha_CLIdSetId-6 (indicating p0_Alpha_CLIdSet-6).

p0_Alpha_CLIdSRSSet-3=p0_Alpha_CLIdSetId-7 (indicating p0_Alpha_CLIdSet-7) are configured for a BWP of the UE.

p0_Alpha_CLIdPUSCHSet-0 and p0_Alpha_CLIdSRSSet-3 are associated with UL TCI-state-5.

p0_Alpha_CLIdPUSCHSet-1 and p0_Alpha_CLIdSRSSet-2 are associated with UL TCI-state-14.

p0_Alpha_CLIdPUSCHSet-2 and p0_Alpha_CLIdSRSSet-1 are associated with UL TCI-state-23.

p0_Alpha_CLIdPUSCHSet-3 and p0_Alpha_CLIdSRSSet-0 are associated with UL TCI-state-45.

SSB-1 is the PL-RS associated with UL TCI-state-5,

SSB-2 is the PL-RS associated with UL TCI-state-14,

SSB-3 is the PL-RS associated with UL TCI-state-23, and

SSB-4 is the PL-RS associated with UL TCI-state-45.

SSB-0 is the PL-RS associated with UL TCI-state-0.

It is assumed that UL TCI-state-23 is indicated as the current UL TCI state for UL transmission and applies to PUSCH and SRS, i.e. UL TCI-state-23 is the indicated UL TCI state.

According to the first embodiment, when the type 1 PH is calculated based on an actual PUSCH transmission,

- the $P_{O\_UE\_PUSCH,b,f,c}(j)$ and the $\alpha_{b,f,c}(j)$ are obtained, respectively, by P0 and alpha configured in p0_Alpha_CLIdPUSCHSet-2 (i.e. p0_Alpha_CLIdSet-2) associated with the indicated UL TCI state (i.e. UL TCI-state-23), and
- the $PL_{b,f,c}(q_d)$ is calculated using the reference signal (RS) index $q_d$ determined from SSB-3 associated with the indicated UL TCI state (i.e. UL TCI-state-23).

According to the variety of the first embodiment, when the type 1 PH is calculated based on a reference PUSCH transmission, different approaches are obtained according to different options.

According to Option 1 for $P_{O\_PUSCH,b,f,c}(j)$ and $\alpha_{b,f,c}(j)$ for PUSCH, the $P_{O\_PUSCH,b,f,c}(j)$ and $\alpha_{b,f,c}(j)$ are obtained, respectively, by P0 and alpha configured in p0_Alpha_CLIdPUSCHSet-2 (i.e. p0_Alpha_CLIdSet-2) associated with the indicated UL TCI state (i.e. UL TCI-state-23).

According to Option 2 for $P_{O\_PUSCH,b,f,c}(j)$ and $\alpha_{b,f,c}(j)$ for PUSCH, the $P_{O\_PUSCH,b,f,c}(j)$ and $\alpha_{b,f,c}(j)$ are obtained, respectively, by P0 and alpha configured in p0_Alpha_CLIdPUSCHSet-0 (i.e. p0_Alpha_CLIdSet-0), which is the configured set of P0, alpha and closed loop index for PUSCH having the lowest index.

According to Option 3 for $P_{O\_PUSCH,b,f,c}(j)$ and $\alpha_{b,f,c}(j)$ for PUSCH, the $P_{O\_PUSCH,b,f,c}(j)$ and $\alpha_{b,f,c}(j)$ are obtained, respectively, by P0 and alpha configured in p0_Alpha_CLIdSet-0 (i.e. p0_Alpha_CLIdPUSCHSet-0 in this example), which is the configured common set of P0, alpha and closed loop index having the lowest index.

According to Option 1 for $PL_{b,f,c}(q_d)$ for PUSCH, the $PL_{b,f,c}(q_d)$ is calculated using the reference signal (RS) index $q_d$ determined from SSB-3 associated with the indicated UL TCI state (i.e. UL TCI-state-23).

According to Option 2 for $PL_{b,f,c}(q_d)$ for PUSCH, the $PL_{b,f,c}(q_d)$ is calculated using the reference signal (RS) index $q_d$ determined from SSB-1 associated with UL TCI-state-5 (i.e. the activated UL TCI state with the lowest TCI state ID).

According to Option 3 for $PL_{b,f,c}(q_d)$ for PUSCH, the $PL_{b,f,c}(q_d)$ is calculated using the reference signal (RS) index $q_d$ determined from SSB-0 associated with UL TCI-state-0 (i.e. the configured UL TCI state with the lowest TCI state ID)

According to the second embodiment, when the type 3 PH is calculated based on an actual SRS transmission,

- the $P_{O\_SRS,b,f,c}(q_s)$ and the $\alpha_{SRS,b,f,c}(q_s)$ are obtained, respectively, by P0 and alpha configured in p0_Alpha_CLIdSRSSet-1 (i.e. p0_Alpha_CLIdSet-5) associated with the indicated UL TCI state (i.e. UL TCI-state-23), and
- the $PL_{b,f,c}(q_d)$ is calculated using the reference signal (RS) index $q_d$ determined from SSB-3 associated with the indicated UL TCI state (i.e. UL TCI-state-23).

According to the variety of the second embodiment, when the type 3 PH is calculated based on a reference SRS transmission, different approaches are obtained according to different options.

According to Option 1 for $P_{O\_SRS,b,f,c}(q_s)$ and the $\alpha_{SRS,b,f,c}(q_s)$ for SRS, the $P_{O\_SRS,b,f,c}(q_s)$ and the $\alpha_{SRS,b,f,c}(q_s)$ are obtained, respectively, by P0 and alpha configured in p0_Alpha_CLIdSRSSet-1 (i.e. p0_Alpha_CLIdSet-5) associated with the indicated UL TCI state (i.e. UL TCI-state-23).

According to Option 2 for $P_{O\_SRS,b,f,c}(q_s)$ and the $\alpha_{SRS,b,f,c}(q_s)$ for SRS, the $P_{O\_SRS,b,f,c}(q_s)$ and the $\alpha_{SRS,b,f,c}(q_s)$ are obtained, respectively, by P0 and alpha configured in p0_Alpha_CLIdSRSSet-0 (i.e. p0_Alpha_CLIdSet-4), which is the configured set of P0, alpha and closed loop index for SRS having the lowest index.

According to Option 3 for $P_{O\_SRS,b,f,c}(q_s)$ and the $\alpha_{SRS,b,f,c}(q_s)$ for SRS, the $P_{O\_SRS,b,f,c}(q_s)$ and the $\alpha_{SRS,b,f,c}(q_s)$ are obtained, respectively, by P0 and alpha configured in p0_Alpha_CLIdSet-0 (i.e. p0_Alpha_CLIdPUSCHSet-0 in this example), which is the configured common set of P0, alpha and closed loop index having the lowest index.

According to Option 1 for $PL_{b,f,c}(Aa)$ for SRS, $PL_{b,f,c}(q_d)$ is obtained using the reference signal (RS) index $q_d$ determined from SSB-3 associated with the indicated UL TCI state (i.e. UL TCI-state-23).

According to Option 2 for $PL_{b,f,c}(Aa)$ for SRS, $PL_{b,f,c}(Aa)$ is obtained using the reference signal (RS) index $q_d$ determined from SSB-1 associated with UL TCI-state-5 (i.e. the activated UL TCI state having the lowest TCI state ID).

According to Option 3 for $PL_{b,f,c}(q_d)$ for SRS, $PL_{b,f,c}(q_d)$ is obtained using the reference signal (RS) index $q_d$ determined from SSB-0 associated with UL TCI-state-0) (i.e. the configured UL TCI state with the lowest TCI state ID).

All of the above description is related to the determination of power control parameters (e.g. PL-RS, P0, alpha and closed loop index) at the UE's side.

When the power control parameters are determined, the UE may calculate power headroom (PH) at least based on the determined power control parameters. Needless to say, the present disclosure only relates to the determination of power control parameters. The determination of other parameters necessary for calculating the PH is not in the scope of this disclosure.

The UE calculates the power headroom and reports (i.e. transmits) the calculated power headroom to the base station (e.g. gNB). The gNB receives the calculated power headroom. The gNB needs to know how the power headroom is calculated. For example, the gNB determines the power control parameters with the same manner as the UE's side, so that the gNB knows that the received power headroom is calculated based on what power control parameters.

FIG. 1 is a schematic flow chart diagram illustrating an embodiment of a method 300 according to the present application. In some embodiments, the method 100 is performed by an apparatus, such as a remote unit (e.g. UE). In certain embodiments, the method 100 may be performed by a processor executing program code, for example, a microcontroller, a microprocessor, a CPU, a GPU, an auxiliary processing unit, a FPGA, or the like. The method 100 is a method of a UE, comprising: 102 determining power control parameters used for calculating power headroom according to a configured or activated or indicated UL TCI state or jointed DL/UL TCI state; 104 calculating the power headroom based on the determined power control parameters; and 106 transmitting the calculated power headroom.

In one embodiment, when the power headroom is calculated based on an actual PUSCH transmission, and a PL-RS and a set of P0, alpha and closed loop index for PUSCH are associated with the indicated UL TCI state or joint DL/UL TCI state, $P_{O\_UE\_PUSCH,b,f,c}(j)$ and $\alpha_{b,f,c}(j)$ in the power control parameters are obtained, respectively, by P0 and alpha configured in the set of P0, alpha and closed loop index for PUSCH associated with the indicated UL TCI state or joint DL/UL TCI state, and $PL_{b,f,c}(q_d)$ in the power control parameters is calculated using the RS resource index $q_d$ determined from the PL-RS associated with the indicated UL TCI state or joint DL/UL TCI state.

In another embodiment, when the power headroom is calculated based on a reference PUSCH transmission, and a set of P0, alpha and closed loop index for PUSCH and/or a common set of P0, alpha and closed loop index are associated with the configured or indicated UL TCI state or joint DL/UL TCI state. $P_{O\_PUSCH,b,f,c}(j)$ and $\alpha_{b,f,c}(j)$ in the power control parameters are obtained, respectively, by P0 and alpha configured in the set of P0, alpha and closed loop index for PUSCH associated with the indicated UL TCI state or the joint DL/UL TCI state, or P0 and alpha configured in the set of P0, alpha and closed loop index for PUSCH having the lowest index, or P0 and alpha configured in the common set of P0, alpha and closed loop index having the lowest index. When the power headroom is calculated based on a reference PUSCH transmission. $PL_{b,f,c}(q_d)$ in the power control parameters is obtained using the reference signal (RS) index $q_d$ determined from the PL-RS associated with the indicated UL TCI state or joint DL/UL TCI state, or the PL-RS associated with the activated UL TCI state or joint DL/UL TCI state having the lowest TCI state ID, or the PL-RS associated with the configured UL TCI state or joint DL/UL TCI state having the lowest TCI state ID.

In yet another embodiment, when the power headroom is calculated based on an actual SRS transmission, and a PL-RS and a set of P0, alpha and closed loop index for SRS are associated with the indicated UL TCI state or joint DL/UL TCI state, $P_{O\_SRS,b,f,c}(q_s)$ and $\alpha_{SRS,b,f,c}(q_s)$ in the power control parameters are obtained, respectively, by P0 and alpha configured in the set of P0, alpha and closed loop index for SRS associated with the indicated UL TCI state or joint DL/UL TCI state, and $PL_{b,f,c}(q_d)$ in the power control parameters is calculated using the RS resource index $q_d$ determined from the PL-RS associated with the indicated UL TCI state or joint DL/UL TCI state.

In a further embodiment, when the power headroom is calculated based on a reference SRS transmission, and a set of P0, alpha and closed loop index for SRS and/or a common set of P0, alpha and closed loop index are associated with the configured or indicated UL TCI state or joint DL/UL TCI state. $P_{O\_SRS,b,f,c}(q_s)$ and $\alpha_{SRS,b,f,c}(q_s)$ in the power control parameters are obtained, respectively, by P0 and alpha configured in the set of P0, alpha and closed loop index for SRS associated with the indicated UL TCI state or joint DL/UL TCI state, or P0 and alpha configured in the set of P0, alpha and closed loop index for SRS having the lowest index, or P0 and alpha configured in the common set of P0, alpha and closed loop index having the lowest index. When the power headroom is calculated based on a reference SRS transmission. $PL_{b,f,c}(q_d)$ in the power control parameters is obtained using the reference signal (RS) index $q_d$ determined from the PL-RS associated with the indicated UL TCI state or the joint DL/UL TCI state, or the PL-RS associated with the activated UL TCI state or joint DL/UL TCI state having the lowest TCI state ID, or the PL-RS associated with the configured UL TCI state or joint DL/UL TCI state having the lowest TCI state ID.

Figure 2:
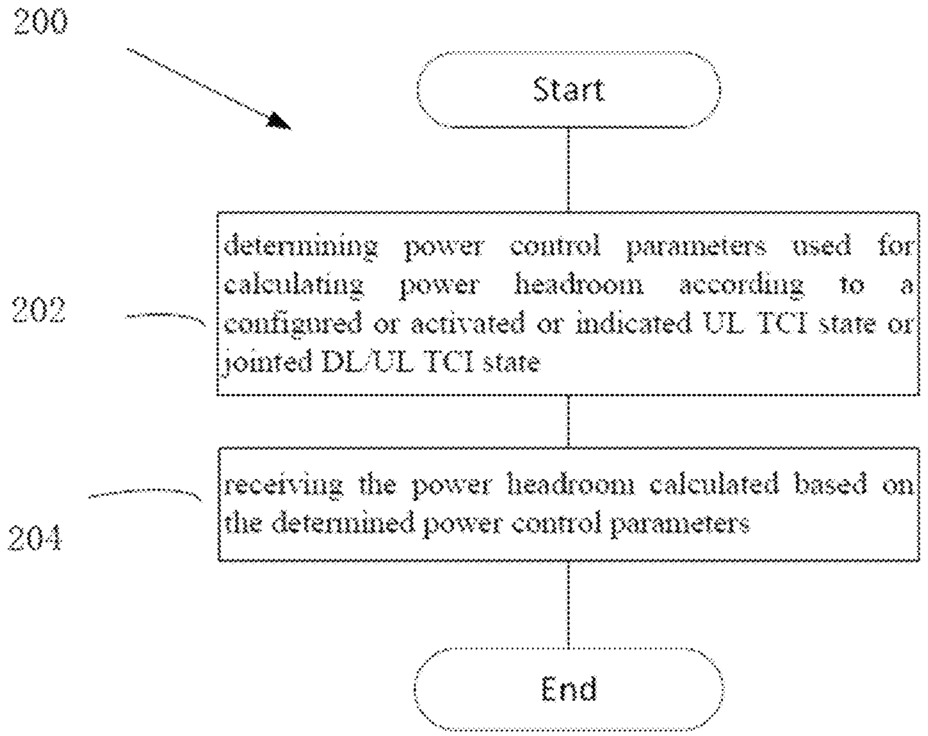
FIG. 2 is a schematic flow chart diagram illustrating an embodiment of another method.

FIG. 2 is a schematic flow chart diagram illustrating an embodiment of a method 200 according to the present application. In some embodiments, the method 200 is performed by an apparatus, such as a base unit. In certain embodiments, the method 200 may be performed by a processor executing program code, for example, a microcontroller, a microprocessor, a CPU, a GPU, an auxiliary processing unit, a FPGA, or the like.

The method 200 may comprise 202 determining power control parameters used for calculating power headroom according to a configured or activated or indicated UL TCI state or jointed DL/UL TCI state; and 204 receiving the power headroom calculated based on the determined power control parameters. In one embodiment, when the power headroom is calculated based on an actual PUSCH transmission, and a PL-RS and a set of P0, alpha and closed loop index for PUSCH are associated with the indicated UL TCI state or joint DL/UL TCI state. $P_{O\_UE\_PUSCH,b,f,c}(j)$ and $\alpha_{b,f,c}(j)$ in the power control parameters are obtained, respectively, by P0 and alpha configured in the set of P0, alpha and closed loop index for PUSCH associated with the indicated UL TCI state or joint DL/UL TCI state, and $PL_{b,f,c}(q_d)$ in the power control parameters is calculated using the RS resource index $q_d$ determined from the PL-RS associated with the indicated UL TCI state or joint DL/UL TCI state.

In another embodiment, when the power headroom is calculated based on a reference PUSCH transmission, and a set of P0, alpha and closed loop index for PUSCH and/or a common set of P0, alpha and closed loop index are associated with the configured or indicated UL TCI state or joint DL/UL TCI state, $P_{O\_PUSCH,b,f,c}(j)$ and $\alpha_{b,f,c}(j)$ in the power control parameters are obtained, respectively, by P0 and alpha configured in the set of P0, alpha and closed loop index for PUSCH associated with the indicated UL TCI state or the joint DL/UL TCI state, or P0 and alpha configured in the set of P0, alpha and closed loop index for PUSCH having the lowest index, or P0 and alpha configured in the common set of P0, alpha and closed loop index having the lowest index. When the power headroom is calculated based on a reference PUSCH transmission, $PL_{b,f,c}(q_d)$ in the power control parameters is obtained using the reference signal (RS) index $q_d$ determined from the PL-RS associated with the indicated UL TCI state or joint DL/UL TCI state, or the PL-RS associated with the activated UL TCI state or joint DL/UL TCI state having the lowest TCI state ID, or the PL-RS associated with the configured UL TCI state or joint DL/UL TCI state having the lowest TCI state ID.

In yet another embodiment, when the power headroom is calculated based on an actual SRS transmission, and a PL-RS and a set of P0, alpha and closed loop index for SRS are associated with the indicated UL TCI state or joint DL/UL TCI state, $P_{O\_SRS,b,f,c}(q_s)$ and $\alpha_{SRS,b,f,c}(q_s)$ in the power control parameters are obtained, respectively, by P0 and alpha configured in the set of P0, alpha and closed loop index for SRS associated with the indicated UL TCI state or joint DL/UL TCI state, and $PL_{b,f,c}(q_d)$ in the power control parameters is calculated using the RS resource index $q_d$ determined from the PL-RS associated with the indicated UL TCI state or joint DL/UL TCI state.

In a further embodiment, when the power headroom is calculated based on a reference SRS transmission, and a set of P0, alpha and closed loop index for SRS and/or a common set of P0, alpha and closed loop index are associated with the configured or indicated UL TCI state or joint DL/UL TCI state, $P_{O\_SRS,b,f,c}(q_s)$ and $\alpha_{SRS,b,f,c}(q_s)$ in the power control parameters are obtained, respectively, by P0 and alpha configured in the set of P0, alpha and closed loop index for SRS associated with the indicated UL TCI state or joint DL/UL TCI state, or P0 and alpha configured in the set of P0, alpha and closed loop index for SRS having the lowest index, or P0 and alpha configured in the common set of P0, alpha and closed loop index having the lowest index. When the power headroom is calculated based on a reference SRS transmission, $PL_{b,f,c}(q_d)$ in the power control parameters is obtained using the reference signal (RS) index $q_d$ determined from the PL-RS associated with the indicated UL TCI state or the joint DL/UL TCI state, or the PL-RS associated with the activated UL TCI state or joint DL/UL TCI state having the lowest TCI state ID, or the PL-RS associated with the configured UL TCI state or joint DL/UL TCI state having the lowest TCI state ID.

Figure 3:
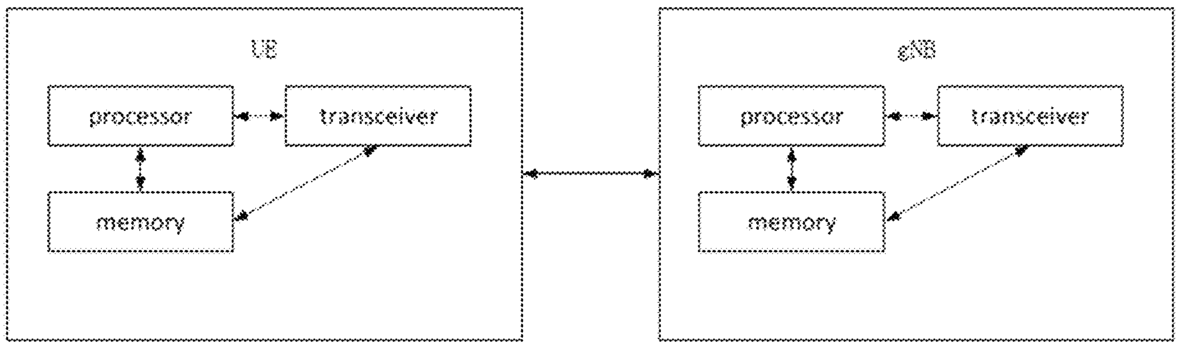
FIG. 3 is a schematic block diagram illustrating apparatuses according to one embodiment.

FIG. 3 is a schematic block diagram illustrating apparatuses according to one embodiment.

Referring to FIG. 3, the UE (i.e. the remote unit) includes a processor, a memory, and a transceiver. The processor implements a function, a process, and/or a method which are proposed in FIG. 1.

The UE comprises a processor that determines power control parameters used for calculating power headroom according to a configured or activated or indicated UL TCI state or jointed DL/UL TCI state, and calculates the power headroom based on the determined power control parameters; and a transmitter that transmits the calculated power headroom.

In one embodiment, when the power headroom is calculated based on an actual PUSCH transmission, and a PL-RS and a set of P0, alpha and closed loop index for PUSCH are associated with the indicated UL TCI state or joint DL/UL TCI state, $P_{O\_UE\_PUSCH,b,f,c}(j)$ and $\alpha_{b,f,c}(j)$ in the power control parameters are obtained, respectively, by P0 and alpha configured in the set of P0, alpha and closed loop index for PUSCH associated with the indicated UL TCI state or joint DL/UL TCI state, and $PL_{b,f,c}(Aa)$ in the power control parameters is calculated using the RS resource index $q_d$ determined from the PL-RS associated with the indicated UL TCI state or joint DL/UL TCI state.

In another embodiment, when the power headroom is calculated based on a reference PUSCH transmission, and a set of P0, alpha and closed loop index for PUSCH and/or a common set of P0, alpha and closed loop index are associated with the configured or indicated UL TCI state or joint DL/UL TCI state, $P_{O\_PUSCH,b,f,c}(j)$ and $\alpha_{b,f,c}(j)$ in the power control parameters are obtained, respectively, by P0 and alpha configured in the set of P0, alpha and closed loop index for PUSCH associated with the indicated UL TCI state or the joint DL/UL TCI state, or P0 and alpha configured in the set of P0, alpha and closed loop index for PUSCH having the lowest index, or P0 and alpha configured in the common set of P0, alpha and closed loop index having the lowest index. When the power headroom is calculated based on a reference PUSCH transmission, $PL_{b,f,c}(q)$ in the power control parameters is obtained using the reference signal (RS) index $q_d$ determined from the PL-RS associated with the indicated UL TCI state or joint DL/UL TCI state, or the PL-RS associated with the activated UL TCI state or joint DL/UL TCI state having the lowest TCI state ID, or the PL-RS associated with the configured UL TCI state or joint DL/UL TCI state having the lowest TCI state ID.

In yet another embodiment, when the power headroom is calculated based on an actual SRS transmission, and a PL-RS and a set of P0, alpha and closed loop index for SRS are associated with the indicated UL TCI state or joint DL/UL TCI state, $P_{O\_SRS,b,f,c}(q_s)$ and $\alpha_{SRS,b,f,c}(q_s)$ in the power control parameters are obtained, respectively, by P0 and alpha configured in the set of P0, alpha and closed loop index for SRS associated with the indicated UL TCI state or joint DL/UL TCI state, and $PL_{b,f,c}(q_d)$ in the power control parameters is calculated using the RS resource index $q_d$ determined from the PL-RS associated with the indicated UL TCI state or joint DL/UL TCI state.

In a further embodiment, when the power headroom is calculated based on a reference SRS transmission, and a set of P0, alpha and closed loop index for SRS and/or a common set of P0, alpha and closed loop index are associated with the configured or indicated UL TCI state or joint DL/UL TCI state, $P_{O\_SRS,b,f,c}(q_s)$ and $\alpha_{SRS,b,f,c}(q_s)$ in the power control parameters are obtained, respectively, by P0 and alpha configured in the set of P0, alpha and closed loop index for SRS associated with the indicated UL TCI state or joint DL/UL TCI state, or P0 and alpha configured in the set of P0, alpha and closed loop index for SRS having the lowest index, or P0 and alpha configured in the common set of P0, alpha and closed loop index having the lowest index. When the power headroom is calculated based on a reference SRS transmission. $PL_{b,f,c}(q_d)$ in the power control parameters is obtained using the reference signal (RS) index $q_d$ determined from the PL-RS associated with the indicated UL TCI state or the joint DL/UL TCI state, or the PL-RS associated with the activated UL TCI state or joint DL/UL TCI state having the lowest TCI state ID, or the PL-RS associated with the configured UL TCI state or joint DL/UL TCI state having the lowest TCI state ID.

The gNB (i.e. the base unit) includes a processor, a memory, and a transceiver. The processor implements a function, a process, and/or a method which are proposed in FIG. 2.

The base unit comprises a processor that determines power control parameters used for calculating power headroom according to a configured or activated or indicated UL TCI state or jointed DL/UL TCI state; and a receiver that receives the power headroom calculated based on the determined power control parameters.

In one embodiment, when the power headroom is calculated based on an actual PUSCH transmission, and a PL-RS and a set of P0, alpha and closed loop index for PUSCH are associated with the indicated UL TCI state or joint DL/UL TCI state, $P_{O\_UE\_PUSCH,b,f,c}(j)$ and $\alpha_{b,f,c}(j)$ in the power control parameters are obtained, respectively, by P0 and alpha configured in the set of P0, alpha and closed loop index for PUSCH associated with the indicated UL TCI state or joint DL/UL TCI state, and $PL_{b,f,c}(q_d)$ in the power control parameters is calculated using the RS resource index $q_d$ determined from the PL-RS associated with the indicated UL TCI state or joint DL/UL TCI state.

In another embodiment, when the power headroom is calculated based on a reference PUSCH transmission, and a set of P0, alpha and closed loop index for PUSCH and/or a common set of P0, alpha and closed loop index are associated with the configured or indicated UL TCI state or joint DL/UL TCI state, $P_{O\_PUSCH,b,f,c}(j)$ and $\alpha_{b,f,c}(j)$ in the power control parameters are obtained, respectively, by P0 and alpha configured in the set of P0, alpha and closed loop index for PUSCH associated with the indicated UL TCI state or the joint DL/UL TCI state, or P0 and alpha configured in the set of P0, alpha and closed loop index for PUSCH having the lowest index, or p0 and alpha configured in the common set of P0, alpha and closed loop index having the lowest index. When the power headroom is calculated based on a reference PUSCH transmission, $PL_{b,f,c}(q_d)$ in the power control parameters is obtained using the reference signal (RS) index $q_d$ determined from the PL-RS associated with the indicated UL TCI state or joint DL/UL TCI state, or the PL-RS associated with the activated UL TCI state or joint DL/UL TCI state having the lowest TCI state ID, or the PL-RS associated with the configured UL TCI state or joint DL/UL TCI state having the lowest TCI state ID.

In yet another embodiment, when the power headroom is calculated based on an actual SRS transmission, and a PL-RS and a set of P0, alpha and closed loop index for SRS are associated with the indicated UL TCI state or joint DL/UL TCI state, $P_{O\_SRS,b,f,c}(q_s)$ and $\alpha_{SRS,b,f,c}(q_s)$ in the power control parameters are obtained, respectively, by P0 and alpha configured in the set of P0, alpha and closed loop index for SRS associated with the indicated UL TCI state or joint DL/UL TCI state, and $PL_{b,f,c}(q_d)$ in the power control parameters is calculated using the RS resource index $q_d$ determined from the PL-RS associated with the indicated UL TCI state or joint DL/UL TCI state.

In a further embodiment, when the power headroom is calculated based on a reference SRS transmission, and a set of P0, alpha and closed loop index for SRS and/or a common set of P0, alpha and closed loop index are associated with the configured or indicated UL TCI state or joint DL/UL TCI state. $P_{O\_SRS,b,f,c}(q_s)$ and $\alpha_{SRS,b,f,c}(q_s)$ in the power control parameters are obtained, respectively, by P0 and alpha configured in the set of P0, alpha and closed loop index for SRS associated with the indicated UL TCI state or joint DL/UL TCI state, or P0 and alpha configured in the set of P0, alpha and closed loop index for SRS having the lowest index, or P0 and alpha configured in the common set of P0, alpha and closed loop index having the lowest index. When the power headroom is calculated based on a reference SRS transmission, $PL_{b,f,c}(q_d)$ in the power control parameters is obtained using the reference signal (RS) index $q_d$ determined from the PL-RS associated with the indicated UL TCI state or the joint DL/UL TCI state, or the PL-RS associated with the activated UL TCI state or joint DL/UL TCI state having the lowest TCI state ID, or the PL-RS associated with the configured UL TCI state or joint DL/UL TCI state having the lowest TCI state ID.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated in the appended claims rather than by the foregoing description. All changes which come within the meaning and range of equivalency of the claims are to be embraced within their scope.

The invention claimed is:

1. A method performed by a user equipment (UE), the method comprising:

determining power control parameters used for calculating power headroom based at least in part on a reference physical uplink shared channel (PUSCH) transmission and according to an indicated uplink (UL) transmission configuration indicator (TCI) state or a joint downlink (DL)/UL TCI state, wherein:

a set of a target received power, a path loss compensation factor, and a power control adjustment state index for PUSCH and a pathloss reference signal (PL-RS) are associated with the indicated UL TCI state or the joint DL/UL TCI state;

the power control parameters are determined based at least in part on the target received power, the path loss compensation factor, and the power control adjustment state index configured in the set; and a downlink pathloss estimate in the power control parameters is obtained using a reference signal (RS) index determined from the PL-RS;

calculating the power headroom based on the determined power control parameters and the reference PUSCH transmission; and transmitting the calculated power headroom.

2. The method of claim 1, wherein the power headroom is calculated in response to a periodic timer expiring when no actual PUSCH transmission is available.

3. The method of claim 1, wherein the power headroom is a Type 1 power headroom indicating a difference between a nominal UE maximum transmit power and an estimated power for uplink shared channel transmission per activated serving cell.

4. A base unit for wireless communication, comprising:

at least one memory; and at least one processor coupled with the at least one memory and configured to cause the base unit to:

determine power control parameters used for calculating power headroom based at least in part on a reference physical uplink shared channel PUSCH) transmission and according to an indicated uplink (UL) transmission configuration indicator (TCI) state or a joint downlink (DL)/UL TCI state, wherein:

a set of a target received power, a path loss compensation factor, and a power control adjustment state index for PUSCH and a pathloss reference signal (PL-RS) are associated with the indicated UL TCI state or the joint DL/UL TCI state;

the power control parameters are determined based at least in part on the target received power, the path loss compensation factor, and the power control adjustment state index configured in the set; and a downlink pathloss estimate in the power control parameters is obtained using a reference signal (RS) index determined from the PL-RS; and receive the power headroom calculated based on the determined power control parameters and the reference PUSCH transmission.

5. The base unit of claim 4, wherein the power headroom is a Type 1 power headroom indicating a difference between a nominal UE maximum transmit power and an estimated power for uplink shared channel transmission per activated serving cell.

6. A user equipment (UE) for wireless communication, comprising:

at least one memory; and at least one processor coupled with the at least one memory and configured to cause the UE to:

determine power control parameters used for calculating power headroom based at least in part on a reference physical uplink shared channel PUSCH) transmission and according to an indicated uplink (UL) transmission configuration indicator (TCI) state or a joint downlink (DL)/UL TCI state, wherein:

a set of a target received power, a path loss compensation factor, and a power control adjustment state index for PUSCH and a pathloss reference signal (PL-RS) are associated with the indicated UL TCI state or the joint DL/UL TCI state;

the power control parameters are determined based at least in part on the target received power, the path loss compensation factor, and the power control adjustment state index configured in the set; and a downlink pathloss estimate in the power control parameters is obtained using a reference signal (RS) index determined from the PL-RS:

calculate the power headroom based on the determined power control parameters and the reference PUSCH transmission; and transmit the calculated power headroom.

7. The UE of claim 6, wherein the power headroom is calculated in response to a periodic timer expiring when no actual PUSCH transmission is available.

8. The UE of claim 6, wherein the power headroom is a Type 1 power headroom indicating a difference between a nominal UE maximum transmit power and an estimated power for uplink shared channel transmission per activated serving cell.

9. A processor for wireless communication, comprising:

at least one controller coupled with at least one memory and configured to cause the processor to:

determine power control parameters used for calculating power headroom based at least in part on a reference physical uplink shared channel (PUSCH) transmission and according to an indicated uplink (UL) transmission configuration indicator (TCI) state or a joint downlink (DL)/UL TCI state, wherein:

a set of a target received power, a path loss compensation factor, and a power control adjustment state index for PUSCH and a pathloss reference signal (PL-RS) are associated with the indicated UL TCI state or the joint DL/UL TCI state;

the power control parameters are determined based at least in part on the target received power, the path loss compensation factor, and the power control adjustment state index configured in the set; and a downlink pathloss estimate in the power control parameters is obtained using a reference signal (RS) index determined from the PL-RS;

calculate the power headroom based on the determined power control parameters and the reference PUSCH transmission; and transmit the calculated power headroom.

10. The processor of claim 9, wherein the power headroom is calculated in response to a periodic timer expiring when no actual PUSCH transmission is available.

11. The processor of claim 9, wherein the power headroom is a Type 1 power headroom indicating a difference between a nominal UE maximum transmit power and an estimated power for uplink shared channel transmission per activated serving cell.

* * * * *